Patented Jan. 1, 1924.

1,479,329

UNITED STATES PATENT OFFICE.

MARJORIE G. SNELLING, OF ALLENTOWN, PENNSYLVANIA.

BEVERAGE.

No Drawing.    Application filed September 10, 1921.  Serial No. 499,684.

*To all whom it may concern:*

Be it known that I, MARJORIE G. SNELLING, a citizen of the United States, residing at Allentown, in the county of Lehigh and State of Pennsylvania, have invented certain new and useful Improvements in Beverages, of which the following is a specification.

My invention relates to improvements in beverages, and more particularly relates to an improved citrous fruit drink, which possesses a very pleasant flavor and " tang," superior in these respects to even the pure fruit juices.

It has long been known that the peels of citrous fruits possess a flavor-giving principle, and that the juice present in the pulp is greatly improved in flavor by the presence of this principle. The flavor-giving agent in the peel is an oil however, which is very insoluble in water and in the pure fruit juice. The flavor-giving oil can be extracted from the peel by suitable means, and indeed such oils form articles of commerce but the emulsifying of the oil in the pure or diluted fruit juices is difficult, and can only be brought about by breaking up the oil globules until they are extremely minute, and even when so " homogenized" the resulting product is not permanent, the oil globules tending to unite to form larger globules, which then tend to rise to the top of the fluid.

It is well recognized that the taste imparted to a fluid by suspended insoluble globules depends upon the area of surface of such globules which is presented to the tongue or other taste-centers of the mouth. Advantage has been taken of this principle in the homogenizing of milk, and it has been found that when the fat globules are subdivided so as to present a greater amount of surface for any given weight of fat present, the taste of the milk is very much improved, and the impression of " creaminess " is greatly increased. This same condition is true of fruit juice containing suspended globules of oil, and the flavor produced by the presence of such oil globules is a direct factor of the area of surface which they present to the taste organs of the mouth. Accordingly when the minute globules of the flavor-giving oil in any suspension of these globules in fruit juices tend to coalesce to form larger globules, the flavor of the product undergoes a marked change, and the improvement produced by the addition of the finely divided oil globules disappears. Although many efforts have been made in the past to obtain satisfactory beverages from oranges, lemons and other citrous fruits by crushing the entire fruit including the peel, none of these efforts have been successful in obtaining a product in which the oil globules were permanently suspended, or in which the full flavor of the oily principle was retained on standing.

I have discovered that in the presence of lactic acid the flavor-giving principle which is present in the peel of citrous fruits is changed in nature, so that it forms a permanent suspension in water or in the fruit juice. Although I have no positive evidence as to the precise mechanism of the change which occurs, it is my belief that the oily flavor-giving principles are rendered partly or wholly soluble through the action of the lactic acid, as I have found that the intensity of the taste imparted by the essential oils of the peel increases very materially when lactic acid is added to a suspension of the oil globules in water. As it does not seem likely that under these circumstances the lactic acid is capable of causing a subdivision of the oil globules into smaller globules presenting increased surface, the passing of these globules into solution seems likely. Other acids, such as citric acid for example, do not have this same effect, and apparently the action is one specific to lactic acid.

As an example of the procedure which I follow in making a citrous fruit beverage according to my present invention, I will describe the method which I use in preparing an orange drink from the juice and the peel of navel oranges. To make ten liters of the beverage, I take one dozen oranges of the usual size, cut them in halves, and express the juice. I then grind the peels to a pulp. To this pulp I add about two liters of water, containing 40 grams of pure lactic acid. I mix the ground peel with the dilute solution of lactic acid, and allow the well mixed material to stand for about one hour, when I subject the material to pressure, so as to remove the fluids present as completely as possible. To the pulp remaining after the first pressing I add an additional liter of water, and again press, in this way removing an additional amount of fluid containing flavor-giving agents from the ground peel.

To the three liters of extract obtained as above I add the juice expressed from the twelve oranges, and I also add 1,900 grams of sugar, 27 grams additional of lactic acid, and enough water to bring the total volume of the fluid to ten liters.

Although I may vary the proportions of my various ingredients within rather wide limits, I find that the best results are obtained when each liter of my finished product contains the juice and the extracted material from the peel of from one to one and one-half oranges, from 5 grams to 8 grams of lactic acid, and from 140 grams to 200 grams of sugar. Although it is desirable to proceed in the manner which I have described above, it will of course be evident that many changes may be made, without greatly varying the result obtained. Instead of oranges, other citrous fruits may be used, and I find that the flavor-giving principles from the peels of all fruits of the citrous family show a corresponding behavior in the presence of lactic acid, with a great increase in the intensity of the flavor produced by the feebly soluble flavor-giving materials, and at the same time a great increase in the permanency of the suspensions or emulsions produced.

My invention broadly comprises the preparation of beverages from citrous fruits, by separating the flavor-giving principle from the peel of such fruits, and treating this flavor-giving principle with lactic acid to render it soluble in water, or otherwise capable of permanent suspension therein. It is not necessary that the peel should be directly treated with lactic acid, as I find that the ground and macerated peel may be pressed and the extract then treated with the lactic acid solution. In addition to the flavor-giving principles there are also extracted from the peel a number of other bodies partly or wholly soluble in water, and some of these materials tend to gelatinize if the extract from the peel is not brought promptly in contact with the lactic acid solution, and accordingly I prefer to treat the ground and macerated peel directly with a dilute lactic acid solution, this procedure resulting in an improved extraction, and a somewhat heightened flavor as compared with the product obtained when the peel is first pressed or otherwise extracted and the oily flavor-giving products are then treated with lactic acid.

It will be evident that many modifications may be made without departing from the general principles herein disclosed, and accordingly no limitations are to be placed upon my invention, except as indicated in the appended claims.

I claim as my invention:

1. In the preparation of beverages the process which comprises treating the peel of a citrous fruit with an aqueous solution of lactic acid.

2. In the preparation of beverages the process which comprises treating the flavor-giving agents from the peel of a citrous fruit with an aqueous solution of lactic acid.

3. In the preparation of beverages the process which comprises grinding the peel of a citrous fruit, extracting from the ground peel flavor-giving agents, and adding lactic acid to the extract so obtained.

4. A beverage comprising the flavor-giving principle from the peel of a citrous fruit, water, sugar, and lactic acid.

5. A beverage comprising the juice of a citrous fruit, the flavor-giving principle from the peel of a citrous fruit, water, sugar and lactic acid.

In testimony whereof, I have hereunto subscribed my name this 9th day of September, 1921.

MARJORIE G. SNELLING.